ated Oct. 10, 1967

3,346,507
PROCESS OF PREPARING AN ORGANO-SILICA AEROGEL

Thomas A. Taulli, Florissant, Mo., assignor to Monsanto Company, St. Louis, Mo., a corporation of Delaware
No Drawing. Filed June 4, 1962, Ser. No. 199,655
11 Claims. (Cl. 252—316)

The present invention relates to novel silica aerogels, and to novel silica sols for the production of such aerogels. The present invention also relates to processes for preparing such aerogels and sols. The present invention further relates to novel silica aerogels containing carbon and hydrogen atoms which are chemically bound in the aerogels. The present invention more particularly relates to amorphous, pulverulent, organo-silica areogels having novel properties, particularly surface area, pore size and thixotropic capacity, and which are particularly useful as thickening agents.

It has been proposed, heretofore, in U.S. Patent No. 2,093,454, dated Sept. 21, 1937, to Samuel S. Kistler, to produce silica aerogels by precipitating colloidal silica in a liquid as a gel, washing the gel with water to remove an appreciable amount of inorganic metal salts present therein, replacing the water in the gel with a lower boiling water miscible liquid such as ethanol, confining the resultant gel in an autoclave and heating the gel until the liquid in the gel has reached a temperature at which the surface tension of the liquid is so small as to produce no substantial shrinkage of the gel when the vapor is allowed to escape. The vapor is then slowly released from the autoclave so as not to impair the internal structure of the gel. In this way the skeleton structure of the gel is preserved approximately in its original porous state and the product is a light fluffy solid having void spaces up to 99% and higher.

It has also been proposed heretofore in U.S. Patent No. 2,285,449 to Morris D. Marshall, issued June 9, 1942, to prepare inorganic aerogels such as silica aerogels by first forming an aquasol containing a dissolved inorganic alkali metal salt and a colloidal inorganic oxide such as colloidal silica, adding to the aquasol a quantity of a water-miscible organic solvent such as ethanol to precipitate such salt, removing a substantial portion of the precipitated inorganic alkali metal salt from the resulting hydroorganosol and removing the liquid phase, which consists of water and an organic solvent, (e.g. ethanol), from the sol without substantially subjecting the sol to a compressive liquid-solid interface. The silica aerogels, prepared as described in these patents contain some alkali metal cations and are characterized in having a highly porous structure, a specific surface area of between 100 and 250 square meters per gram, and are readily ground or comminuted to particles or aggregates having an average particle size of from 5 to 9 microns, which particles have an external surface area of generally less than 0.5 square meters per gram. Although it is possible to further reduce the particle size of such aerogels, such reduction can only be accomplished by extensive grinding or comminuting (which is expensive) and results in a relatively small decrease in particle size and a concomitant small increase in external surface area, such external surface area being below 0.7 square meters per gram.

Such silica areogels have been widely used as insulating materials, as reinforcing agents or fillers in silicone rubber formulations and as flatting agents in paint and varnish formulations. However, the utility of the afore-described silica aerogels as reinforcing agents in liquid polymerizable materials or liquid thermosetting polymers such as, for example, polyester and epoxide polymers is limited due to the relatively inefficient thickening properties of these aerogels. Thus, in order to secure a desirable thickening of uncured polymers, a relatively large amount, e.g. up to 12% by weight of such aerogels, is required to obtain adequate thickening whereas amounts of thickening agents employed in excess of 4% by weight of the polymers usually adversely affect the properties of such polymers when cured. Also, the relative inefficiency of these aerogels as thickening agents limit their use in polymerizable surface coating materials, such as paints and varnish, where a thixotropic state is desired to prevent the flow and run-off of the coating materials after their application to a particular surface.

In accordance with the present invention it is possible to provide novel silica aerogels that is organosilica aerogels which have many of the advantages of the silica aerogels described in the prior literature, and which, in addition, have excellent thickening properties when incorporated in organic liquids and thus do not have the aforementioned disadvantage inherent in previously known silica aerogels.

It is one object of this invention to provide novel organo-silica aerogels containing carbon and hydrogen atoms chemically combined therein.

It is another object of this invention to provide novel silica sols from which such novel silica aerogels may be prepared.

It is another object of the present invention to provide processes for preparing novel organo-silica aerogels containing carbon and hydrogen atoms chemically combined in such aerogels.

It is further object of the present invention to provide novel, amorphous, pulverulent, organo-silica aerogels having a unique particle size distribution and a unique external surface area.

It is a still further object of the present invention to provide novel, amorphous, pulverulent organo-silica aerogels having unique physical properties and which are especially useful as thickening agents.

Still further objects and advantages of the present invention will become apparent from the following description and the appended claims.

The present invention provides novel, amorphous organo-silica aerogels comprising a silica polymer having siloxy groups and containing carbon and hydrogen atoms chemically bound to a portion of the siloxy groups. The novel organo-silica aerogels are generally characterized in having an $SiO_2$ to carbon atom ratio of from about 10:1 to about 50:1 and an $SiO_2$ to hydrogen atom ratio of from about 0.77:1 to about 2:1. Differently stated, the novel organo-silica aerogels of this invention usually contain in chemically combined form in the aerogel, from about 0.4% to about 1.2% by weight of carbon and from about 0.9% to about 1.5% by weight of hydrogen. The preferred organo-silica aerogels of this invention are further characterized in having a specific surface area of from about 100 to 400 square meters per gram. The novel organo-silica aerogels of this invention which are particularly preferred have the aforementioned characteristics, and, in addition, have at least one or all of the following characteristics: (a) a total pore volume of from about 600 to about 800 milliliters per gram, (b) an average pore radius of between about 100 and 200 angstroms, (c) an average particle size in the range of from about 1.0 to about 2.5 microns, (d) a particle size distribution in the range of from about 0.5 to slightly less than 6.0 microns and (e) an external surface area of from about 1.70 to about 1.95 square meters per gram.

The present invention provides two distinct, but interrelated classes of amorphous organo-silica aerogels having at least the $SiO_2$ to carbon atom and hydrogen atom ratios and specific surface areas within the ranges described in the preceding paragraph. However the two classes of organo-silica aerogels differ from each other with respect to chemical composition and, as will be evident hereinafter, with respect to their ability to thicken certain classes of organic liquids.

One preferred class of the amorphous organo-silica aerogels of this invention hereinafter designated as Group I organo-silica aerogels, comprise a silica polymer having siloxy groups and containing carbon and hydrogen atoms chemically bound to a portion of the siloxy groups in the aerogel and are further characterized in having an $SiO_2$ to carbon atom ratio of from about 10:1 to about 25:1 and an $SiO_2$ to hydrogen atom ratio of from about 0.77:1 to about 1.3:1. Stated differently, the Group I organo-silica aerogels of this invention contain from about 0.9% to about 1.2% by weight of carbon and from about 1.2% to about 1.5% by weight of hydrogen.

Another preferred class of the amorphous organo-silica aerogels of the present invention, hereinafter designated as Group II organo-silica aerogels, comprise a silica polymer having siloxy groups and containing carbon and hydrogen atoms chemically bound to a portion of the siloxy groups in the aerogel and are characterized in having an $SiO_2$ to carbon atom ratio of from about 25:1 to about 50:1 and an $SiO_2$ to hydrogen atom ratio of from about 1.3:1 to about 2:1. Stated differently the Group II organo-silica aerogels contain from about 0.4% to about 0.8% by weight of carbon and from about 0.9% to about 1.2% by weight of hydrogen.

The present invention also provides novel, amorphous, finely divided organo-silica aerogels of the aforementioned classes having the above described chemical compositions and physical properties, and which, preferably, have an external surface area of from about 1.7 to about 1.95 square meters per gram and an average particle size in the range of from about 1.0 to about 2.5 microns. Such finely divided organo-silica aerogels are preferably composed of particles having a particle size distribution in the range of from about 0.5 to slightly less than 6.0 microns. The particle size distribution of the particles of the finely divided organo-silica aerogels of this invention is preferably such that from about 20% to about 30% of the particles have a particle size of between about 0.5 and 1.0 microns, about 20% to about 30% of the particles have a particle size in the range of about 1.0 to 2.0 microns, about 40% to 60% of the particles have a particle size in the range of from about 2.0 to 4.0 microns, and from about 3% to 8% of the particles have a particle size greater than 4.0 microns, but less than 6.0 microns.

As stated hereinbefore the novel amorphous organo-silica aerogels of this invention are characterized in having carbon and hydrogen atoms bound to a portion of the siloxy groups in the aerogel. Although it is not known with certainty how the carbon atoms are bound to the siloxy groups it is believed that the following general types of chemical bondings exist at least to some extent in the organo-silica aerogels.

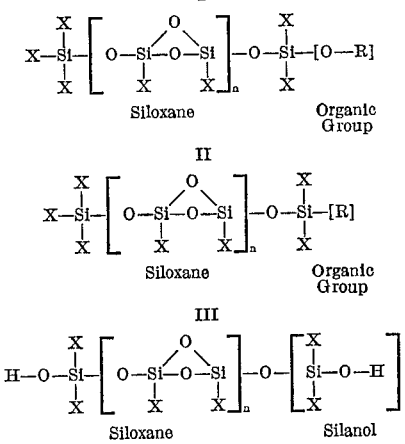

In Formulae I and II, R is an organic group or radical, usually a hydrocarbon group, and, preferably an alkyl group such as, for example, a methyl, ethyl or a propyl group, and X may represent a silica polymer, an organo-substituted silica polymer, an organic group as represented in Formulae I and II, or a silanol group as represented in Formula III. In these formulae "$n$" is a whole number greater than 1.

The novel amorphous organo-silica aerogels of the present invention may be prepared by a process which comprises heating silica aerogels, prepared from certain hereinafter described silica hydro-organosols, at a temperature and for a time sufficient to form organo-silica aerogels having the chemical composition and physical properties hereinbefore described. The heating temperature employed may vary, but will generally depend, as will be hereinafter evident, upon the particular organo-silica aerogel which it is desired to prepare. In general, temperatures in the range of about 90° C. to about 750° C. may be used in most instances. The heating time may vary from a few seconds to several hours and, in general, will depend on the temperature used, but is also dependent upon the particuluar organo-silica aerogel which it is desired to obtain. Generally speaking, shorter heating times are employed when higher temperatures are utilized.

One preferred class of novel organo-silica aerogels of this invention, hereinbefore described as Group I organo-silica aerogels, may be prepared by a process which comprises heating the starting silica aerogels at a temperature in the range of from 90° C. to 375° C., preferably 250° C. to 375° C., until an organo-silica aerogel having the chemical composition and physical properties of the Group I organo-silica aerogels, is formed. The heating times employed may vary widely and are generally in the range of from 3 seconds to several minutes and are usually in the range of from about 3 to about 50 seconds when the preferred temperatures, e.g. 250° C. to 375° C. are employed. Generally speaking, the longer heating times will correspond to the higher temperatures used. When temperatures below 90° C. are employed the heating times are usually unduly prolonged and, moreover, a product resembling the starting silica aerogels is usually obtained. When temperatures above 375° C. are employed a product resembling the Group II organo-silica aerogels is usually obtained.

Another preferred class of organo-silica aerogels of this invention, that is, the Group II organo-silica aerogels, may be prepared by a process which comprises heating a starting silica aerogel at a temperature in the range of from about 350° C. to about 750° C., preferably from about 600° C. to 700° C., until an organo-silico aerogel having the chemical composition and physical properties of the Group II organo-silica aerogels is formed. The heating times employed may vary to some extent depending upon the temperature employed, but are usually in the range of from about 15 seconds to 2 hours, the shorter heating times corresponding to the higher temperatures. When temperatures within the preferred ranges, e.g. about 600° C. to 700° C., are employed the heating time is usually from between about 30 to 90 seconds. When temperatures below 350° C. are employed the product obtained will usually resemble the Group I organo-silica aerogels. On the other hand, when temperatures above 750° C. are used the product generally contains a substantially smaller amount of the carbon and hydrogen than the carbon and hydrogen present in the Group II organo-silica aerogels. Alternatively the Group II organo-silica aerogels may also be prepared by heating the Group I organo-silica aerogels under the above described time and higher temperature conditions.

Although the novel silica aerogels of this invention may be prepared by the processes hereinbefore described, it has been found both desirable and advantageous, in order to obtain optimum benefits and optimum aerogel properties, to heat the starting silica aerogels within the aforementioned ranges of time and temperature at a pressure in the range of from about 10 p.s.i.g. to about 200 p.s.i.g. preferably a pressure of from about 100 to about 200 p.s.i.g. The heating under pressure may be carried out in an atmosphere of an inert gas such as, for example, nitrogen or steam within the above described temperature time and pressure ranges. In the preparation of the Group I organo-silica aerogels it has been found particularly advantageous to heat the starting silica aerogels in an atmosphere of super-heated steam at a pressure of from about 100 p.s.i.g. to about 200 p.s.i.g. In the preparation of the Group II aerogels which are prepared either from starting silica aerogels of from Group I organo-silica aerogels, the heating is usually most advantageously carried out in air either at atmospheric pressure or at the elevated pressure ranges above described and at the temperatures and times hereinbefore described for the preparation of the Group II aerogels.

The novel finely divided amorphous organo-silica aerogels of this invention may be prepared by comminuting or grinding the starting silica aerogels prior to, during or after heating such aerogels under the above described conditions. Simultaneous heating and comminuting or grinding is the preferred procedure.

The starting silica aerogels which can be employed in producing the novel silica aerogels of this invention may advantageously be prepared from certain hereinafter described acidic silica hydro-organosols. Thus, such acidic silica hydro-organosols may be prepared using a procedure somewhat similar to that described in U.S. Patent No. 2,285,477 to John F. White, issued June 9, 1962 or the processes described in the aforementioned Marshall patent provided such procedure or processes are suitably modified. The processes of the White patent comprise first forming an acidic silica aquasol having a pH between 1.8 and 4.5, by acidifying a water-soluble alkali silicate such as sodium silicate with a mineral acid such as sulfuric acid in the proper proportions. This sol, which is an aquasol, is cooled to cause precipitation of the salt formed by the reaction of the silicate and sulfuric acid, and the precipitated salt is removed from the sol. The process of the White patent also provides for the addition of about 0.5% to 25% by weight of the sol of a water-miscible organic liquid, such as ethanol, prior to cooling to facilitate the precipitation of further quantities of the salt.

The sols of the White patent which contain from 0.5% to 25% by weight of the sol, of a water-miscible organic liquid may be suitably modified to provide acidic silica hydro-organosols suitable for preparing the starting silica aerogels of the present invention by adding additional quantities of water-miscible organic liquid in amounts such that the sol contains from about 8 mols to about 20 mols of water-miscible organic liquid per mol of $SiO_2$. Stated differently the water-miscible organic liquid may be added to the sols of White until such sols contain at least 65% by weight, based on the weight of the sol, of water-miscible organic liquid. These sols normally have a relatively low salt content of about 0.1% to 2.0% by weight depending upon the amount of organic liquid used prior to cooling.

The starting acidic silica hydro-organosols employed in the processes of the present invention usually have a pH between about 1.9 and 4.5, preferably between about 2.7 and 3.3, and contain silica, water, 0.3% or less of the above-mentioned salt or electrolyte, and from about 8 to 20 mols, preferably about 10 to 14 mols per mol of $SiO_2$, of a substantially neutral, water-miscible, organic liquid, preferably an organic liquid having a boiling point below that of water. The water and such organic liquid constitutes a homogeneous liquid phase of the hydro-organosols.

The relationship of the amount of silica as $SiO_2$ and the amount of water-miscible organic liquid in the starting acidic hydro-organosols is important and the organo-silica aerogels of this invention will not usually be formed if the water-miscible organic liquid in the hydro-organosol is present in an amount substantially less than 8 mols per mol of $SiO_2$. Although in some instances the silica hydro-organosols may contain more than 20 mols of the organic liquid per mol of $SiO_2$, there is generally no advantage in such sols, and such sols tend to be expensive.

The silica content of the hydro-organosols employed in the processes of the present invention may vary considerably, but is usually between about 1% and 9% by weight of the sol and is preferably in the range of from 3% to 7.5% by weight of the sol.

The neutral or substantially neutral water-miscible organic liquids which may be employed in the hydro-organosol used in the processes of this invention may have a boiling point below or above the boiling point of water. However, it is desirable and preferable to employ neutral, water-miscible organic liquids, more preferably those consisting of carbon, hydrogen and oxygen atoms, which have a boiling point below that of water at atmospheric pressure. As examples of the last-mentioned liquids may be mentioned monohydric alcohols such as methanol, ethanol, isopropanol, tertiary butyl alcohol; ketones such as acetone and methyl ethyl ketone and the like and aliphatic esters. The preferred organic liquids which are most suitably reactive with siloxy groups are the above-mentioned monohydric alcohols, and of these ethanol is particularly preferred.

In a preferred embodiment of this invention, the starting acidic silica hydro-organosols are preferably prepared from acidic silica aquasols which in turn are prepared by first reacting an aqueous solution of sodium silicate and aqueous sulfuric acid at a temperature of between about 0° C. to 15° C. in such proportions and concentrations as to provide an acidic silica aquasol having a pH of about 1.8 and 4.5 and containing sodium sulfate and from about 10% to 18% by weight of $SiO_2$ as silicic acid.

The silica aquasol thus formed is maintained at a temperature in the range of about 0° C. to 15° C. and a substantially neutral, water-miscible organic liquid, preferably ethanol, is mixed therewith to form a silica hydro-organosol containing from about 65% to about 85% of the organic liquid and from about 3% to 7.5% by weight of $SiO_2$ as silicic acid and having a pH in the range of from about 1.8 to about 4.5. The amount of the organic liquid in the sol thus formed is from about 10 to about 14 mols per mol of $SiO_2$ in the sol. The sodium sulfate is substantially insoluble in the above sol and is almost entirely precipitated therefrom. On the removal of the $Na_2SO_4$ by centrifugation, filtration, or the like, a sol is obtained which contains from about 0.1% to 0.3% by weight of $Na_2SO_4$ depending upon the concentration of the organic liquid in the sol and the temperature of the sol.

The acidic silica hydro-organosols which are employed in the processes of the present invention are believed to contain aggregates of colloidal silica and/or polysilicic acid dispersed in the liquid phase thereof. It is believed that these aggregates initially range in size from 10 to 100 angstroms, as the sols are freshly prepared, but such aggregates continue to grow through siloxane polymerization as the sol ages and/or is heated until a hydro-organogel is formed. The rate of which such aggregates will grow generally depends on the concentration of the silica, temperature and the amounts of water-miscible organic liquid present in the sol as initially prepared. These silica sols containing the aggregates are further characterized in having a large number, e.g., 1,000 or more of silanol

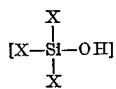

groups on their surfaces, where X in the accompanying formula may be either a siloxane radical, a polysiloxane radical as hereinbefore described, or a hydroxyl group. These aggregates are hydrophilic, yet water-insoluble, and are referred to herein as hydrophilic silica aggregates containing a multitude of silanol groups.

When such hydro-organosols, which comprise colloidally dispersed aggregates of hydrophilic silica or polysilicic acid containing a multitude of silanol groups and a relatively high concentration (e.g., from about 8 to 20 mols per mol of $SiO_2$) of water-miscible organic liquid, are converted to a silica aerogel and are heated, a reaction takes place between some of the molecules of the organic liquid remaining in the aerogel and the siloxy or silanol groups. Although the exact nature of the reaction is unknown, the reaction in part is believed to be a condensation reaction in which, for example, an alcohol reacts with a silanol group substantially as follows:

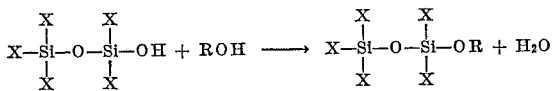

wherein R is an organic group or radical such as $CH_3$, $C_2H_5$ or the like and X is as previously described herein.

Such chemical bonding is believed to be accomplished as heat polymerization proceeds until some of the carbon atoms in the organic groups are chemically bound as hereinbefore indicated to a portion of the siloxy groups in the aerogel. The hydrogen atoms are believed to be bound in the polymer in the form of silanol groups and as hydrocarbon hydrogen.

The starting silica aerogels employed in the processes of this invention may be prepared by heating the starting acidic silica hydro-organosols to form a silica hydro-organo gel, usually by charging the sol to a pressure-resistant vessel and converting the sol to a gel in situ. The silica hydro-organogels so formed, which contain polymerized siloxy groups are believed to contain some carbon and hydrogen atoms chemically bound to a portion of the siloxy groups as above described. These hydro-organogels may then be converted to an aerogel by converting substantially all of the liquid phase to a vapor phase and separating the vapor phase without subjecting it to a substantial compressive liquid-solid interface, for example, in accordance with the liquid removal process of U.S. Patent No. 2,093,454 to Samuel S. Kistler, issued Sept. 21, 1937.

In carrying out the removal of the liquid phase from the gel formed from the hydro-organosol it is necessary to heat the gel in a closed zone or system in which the pressure may be controlled as desired, for example, in an autoclave, at a temperature such that the liquid phase of the gel has been converted to a vapor, and thereafter the vapor may be released slowly from the closed system without appreciable shrinkage of the gel. This temperature may vary from about 30° C. below the critical temperature to about the critical temperature of the liquid phase of the gel, depending upon the particular organic liquid and concentration thereof, present in the liquid phase of the gel. The temperature is then maintained or raised, as desired, while releasing the vapor slowly until essentially all of the vapor is released from the closed system. Although the temperature may be as much as 30° C. below the critical temperature of the liquid phase of the gel in some instances, satisfactory results may be obtained at such a temperature. On the other hand, some shrinkage of the gel does occur, and it is preferred to avoid this shrinkage by operating at least at the critical temperature of the liquid phase of the gel. Higher temperatures may also be used, for example, temperatures up to about 500° C., but it is preferred not to exceed a temperature of about 350° C.

As noted hereinbefore the silica aerogels so prepared may be converted to the novel organo-silica aerogels of this invention by heating, at atmospheric or elevated pressures, the silica aerogels at temperatures and for a time sufficient to form an organo-silica aerogel having a chemical composition and physical properties as hereinbefore described.

In a preferred embodiment of one process of this invention the finely divided Group I organo-silica aerogels are advantageously prepared by simultaneously heating and comminuting the starting silica aerogels in an atmosphere of superheated steam at a pressure in the range of from about 100 p.s.i.g. to about 200 p.s.i.g. and at a temperature in the range of from about 150° C. to about 375° C. until a finely divided Group I organo-silica aerogel is formed. The time required may vary to some extent, depending upon the temperature employed, but will usually vary from 3 seconds to 3 minutes, with the lower temperatures corresponding to the longer heating times.

The heating and comminuting of the aerogels may be suitably accomplished by simultaneously introducing coarse particulates (e.g. particulates having a size such that they will pass through a No. 4 or No. 8 U.S. standard screen) of the starting silica-aerogels and pressurized, superheated steam into an enclosed chamber thereby utilizing the heat and mechanical energy and pressure of the steam to contact and to simultaneously heat and comminute or grind the aerogels.

By so proceeding it is possible to obtain finely divided Group I organo-silica aerogel having an average particle size in the range of from about 1.0 to about 2.5 microns and a particle size distribution as hereinbefore described.

In a particularly advantageous embodiment of the process of this invention for producing the Group I organo-silica aerogels the starting silica aerogels are pre-ground to coarse particles having a particle size of 4 to 8 mesh, and are continuously introduced into a commercially available "steam grinding" mill such as for example a commercial "Jet-O-Mizer" mill manufactured by the Fluid Energy Processing Equipment Company of Philadelphia, Pa. The particles are introduced in the mill so as to be suspended in and contacted with pressurized superheated steam at a pressure of from about 140 p.s.i.g. to 200 p.s.i.g. and at a temperature of about 250° C. to 375° C. for about 3 to 30 seconds. The ground finely divided particles having the particle size range and distribution hereinbefore described are then continuously removed through a discharge opening in the mill.

The Group II organo-silica aerogels of this invention may be advantageously prepared by a process which comprises heating a starting silica aerogel, e.g. a starting silica aerogel prepared as hereinbefore described or a Group I organo-silica aerogel, preferably in an atmosphere of air and at atmospheric pressure and at a temperature in the range of from about 350° C. to about 750° C., preferably about 600° C. to 700° C. until an organo-silica aerogel having the chemical composition and properties corresponding to the previously described Group II organo-silica aerogels, is formed. The heating times employed may vary widely depending upon the temperature used, but are usually within the range of from about 15 seconds to 2 hours, preferably about 30 to 90 seconds. Generally speaking, the shorter heating times correspond to the higher temperatures employed. In a preferred embodiment the Group II organo-silica aerogels are prepared by heating the Group I organo-silica aerogels at the preferred temperatures and times as above described. Although the organo-silica aerogels may be heated in a variety of ways commonly employed by those skilled in the art such as for example, in an oven or a kiln, it has been found particularly advantageous to heat the organo-silica aerogels in a finely divided and in a fluidized state, under the previously stated preferred conditions.

The range of heating temperatures employed (350° C. to 750° C.) is at or above the phase transition temperature of silicic acid, e.g. the temperature range at which silanol groups are condensed to form siloxane or siloxy groups. It would normally be expected that all of the hydrogen from the silanol groups would be removed by condensation of the finely divided organo-silica aerogels from silanol to siloxane groups during the heating process. Also it would be expected that all of the organic carbon and hydrogen would be removed from the organo-silica aerogels at these temperatures, however, substantial amounts of the carbon and hydrogen atoms unexpectedly remain in the aerogel in a chemically combined state.

In a particularly preferred embodiment of this invention relating to the preparation of Group II aerogels a finely divided, Group I organo-silica aerogel is introduced into an elongated zone, such as a cylindrical chamber, through an opening at one end thereof, together with air which has been heated to any temperature within the range of from about 325° C. to 700° C., preferably from 600° C. to 700° C. The heated air fluidizes and moves the finely divided silica aerogel through the length of the zone or chamber to a discharge opening. The residence time in the chamber is usually controlled by regulating the velocity of the heated air. Generally speaking, the velocity of the heated air employed will depend upon the temperature of the air. Thus, when the temperature of the air is at 700° C. the velocity thereof may be so controlled that the dwell or residence time in the zone or chamber is only from 15 to 45 seconds. At lower air temperatures the velocity of the air may be controlled so that the dwell or residence time in the zone or chamber will be of the order of magnitude of from about 30 to about 90 seconds.

The two groups of finely divided organo-silica aerogels of this invention have substantially the same physical characteristics, that is, average particle size, specific surface area, external surface area, average pore diameter and total pore volume. The two groups of organo-silica aerogels differ, however, in the amounts of carbon and hydrogen atoms which are chemically bound to a portion of the siloxy groups as hereinbefore described and also differ in their thickening ability with respect to certain organic liquids as will be evident from the specific examples.

The novel organo-silica aerogels of the present invention are generally suitable for all applications and uses of previously described silica aerogels per se and additionally can be used as thickening agents in liquids in which the previously described silica aerogels cannot ordinarily be used in a saisfactory manner.

A further understanding of the acidic hydro-organosols, organo-silica aerogels and processes of the present invention will be obtained from the following examples which are intended to illustrate the invention, but not to limit the scope thereof, parts and percentages being by weight unless otherwise specified.

EXAMPLE I

Twenty-one hundred parts of an acidic silica ethanol-aquasol having a pH of 2.9 and containing 11% $SiO_2$, 50% ethanol, 0.3% $Na_2SO_4$ and the remainder consisting of water was diluted with 950 parts of 2B ethanol to form an ethanol-aquasol having 10 mols of ethanol per mol of $SiO_2$ and containing 7.3% $SiO_2$, 65.6% ethanol, less than 0.2% $Na_2SO_4$ and the balance water. The diluted sol had a pH of 3.4 and contained about 11 mols of ethanol per mol of $SiO_2$. The bulk of the ethanol-aquasol was charged to an autoclave until 75% of the volume of the autoclave was occupied by the sol. The autoclave was then closed and heated until a pressure of 1900 p.s.i.g. (which was slightly above the critical pressure) was attained. Heating was continued and the ethanol-water vapor was released intermittently from the autoclave to maintain the pressure of 1900 p.s.i.g. until a temperature of 300° C. was obtained. This temperature was above the critical temperature of the liquid phase of the ethanol aquagel. The vapor in the autoclave was released slowly until substantially all of the vapor was removed and the autoclave was then cooled. A light aerogel having a density of 3 pounds per cubic foot and the bulk of which consisted of 95% air was obtained.

The silica aerogel was then ground in an air attrition mill at an air pressure of 58 pounds per square inch gauge at a temperature of 200° C. for 10 seconds to provide a finely divided amorphous material (a Group I organo-silica aerogel) having an average particle size of 2.4 microns and an external surface area of 1.88 square meters per gram, both measurements being determined by the method of J. H. L. Watson in volume 20, page 576 of Analytical Chemistry (1948) and a specific surface area of 275 square meters per gram as measured by the Method of Brunauer, Emmet and Teller described in "Advances in Colloid Science," volume I, pages 1–36 (1942), published by Interscience Publishers, Incorporated, New York, N.Y.

The above material was analyzed for carbon and hydrogen and was found to contain 1.19% carbon and 1.39% hydrogen. The material had an $SiO_2$:C ratio of 15:1 and a $SiO_2$H ratio of 1.1:1. When 1.6% by weight of this organo-silica aerogel was dispersed in a plastisol, specifically a liquid commercial plastisol containing polyvinyl chloride and dioctyl phthalate, the viscosity (Brookfield) increased from 4,000 centipoises to 132,000 centipoises at 25° C. The viscosity measurements were made with a standard Brookfield Model HAT Synchro-electric Viscosimeter at 5 r.p.m. viscosimeter speed.

On the other hand a finely divided silica aerogel was prepared from an acidic silica ethanol aquasol having a $SiO_2$ content of 11% by weigh and containing 50% by weight of alcohol, 0.02% by weight of $Na_2SO_4$ and the balance consisting of water and having a pH of 3.0. The silica aerogel so prepared contained traces (e.g., 0.05% by weight) of carbon, 0.056% by weight of hydrogen and had an $SiO_2$:C ratio of 350:1 and an $SiO_2$:H ratio 3:1. The aerogel was further characterized in having an average particle size of 2.6 microns, a specific surface area 332 square meters per gram, an external surface area of 0.77 square meter per gram and a total pore volume of 730 milliliters per gram.

When the silica aerogel so prepared was added to the above described liquid plastisol, almost 5.0% by weight of the aerogel was required to thicken the said plastisol to a viscosity of 132,000 centipoises at 25° C. Moreover, when the silica aerogel described in the preceding paragraph was heated within the range of 600 to 700° C. in an atmosphere of air, such heating did not substantially increase the thickening capacity of the silica aerogel.

EXAMPLE II

A portion of the organo-silica aerogel prepared as described in the first two paragraphs of Example I was placed in trays and heated in an electric oven in air and at atmospheric pressure at 350° C. for 2 hours. The material (a Group II organo-silica aerogel) so obtained contained 0.6% of carbon and 1.05% hydrogen and had substantially the same physical characteristics, that is, particle size and specific surface area as the organosilica aerogel of Example I. This material had an $SiO_2:C$ ratio of 25:1 and an $SiO_2:H$ ratio of 1.4:1.

When 2% by weight of the heated finely divided organo-silica aerogel was dispersed in a liquid uncured commercial polyester resin "Marco 28C" (produced by Celanese Corporation of America) comprising a condensation product of a polyhydroxy alcohol and an unsaturated polycarboxylic acid dissolved in styrene. The viscosity at 20 r.p.m. (Brookfield) was increased from 850 centipoises to 3600 centipoises at 25° C. On the other hand, a 6% dispersion of a finely divided silica aerogel described in the next to last paragraph of Example I in the same polyester resin resulted in a viscosity (Brookfield) of only 2500 centipoises.

Group I organo-silica aerogels were prepared, using the processes described in the first two paragraphs of Example I and Group II organo-silica aerogels were prepared using the processes described in the initial paragraph of Example II, except that the starting hydro-organo sols contained methanol, isopropanol and acetone respectively, instead of ethanol. In each instance, the Group I organo-silica aerogels produced by the procedures of Example I contained from 1.0% to 1.3% of carbon and from 1.2% to 1.5% of hydrogen and had an $SiO_2:C$ ratio of between 10:1 and 25:1 and an $SiO_2:H$ ratio of 0.77:1 to 1.3:1. After these organo-silica aerogels were processed using the procedures described in Example II, they contained from 0.4% to 0.6% by weight of carbon and from 1.1% to 1.4% of hydrogen. The organo-silica aerogels so prepared efficiently thickened liquid polyvinyl chloride plastisol and polyester resin compositions, but the Group I organo-silica aerogels more efficiently thickened plastisols and the Group II organo-silica aerogels more efficiently thickened liquid uncured polyester resins.

EXAMPLE III

A silica aerogel, prepared according to the procedures described in the first two paragraphs of Example I was heated at 200° C. in air at a pressure of 75 p.s.i.g. in a pressure chamber for 10 seconds and was thereafter ground in a laboratory ball mill. The product so obtained was a finely divided powdered organo-silica aerogel and when analyzed, was found to have substantially the same chemical composition and physical and thixotropic properties as the organo-silica aerogel described in Example I.

EXAMPLE IV

A silica aerogel prepared according to the method described in the first two paragraphs of Example I was heated in air at 200° C. at a pressure of 75 p.s.i. for 10 second and was thereafter heated in air at atmospheric pressure in a laboratory furnace at a temperature of 400° C. for one hour and forty-five minutes. The organo-silica aerogel so produced was then ground in a ball mill to a finely divided powder which, when analyzed, was found to have substantially the same chemical composition as the organo-silica aerogel described in Example II. When tested for its ability to thicken polyester resins using the procedure described in Example II, the finely divided organo-silica aerogel was found to have substantially the same thickening capacity as the organo-silica aerogel described in Example II.

EXAMPLE V

Twenty-one hundred parts of an acidic silica ethanol aquasol having a pH of 2.9 and containing 11% $SiO_2$, 50% ethanol and 0.3% $Na_2SO_4$ and the remainder consisting of water was diluted with 950 parts of 2B ethanol to form an ethanol-aquasol having an ethanol:$SiO_2$ mol ratio of 10:1 and containing 7.3% $SiO_2$, 65.6% ethanol less than 0.2% $Na_2SO_4$ and the balance water. The diluted sol had a pH of 3.4.

The bulk of the diluted ethanol-aquasol was charged to an autoclave until 75% of the volume of the autoclave was occupied by the sol. The sol was then heated in the autoclave at 50° C. until an ethanol-aquagel was formed. The autoclave was then closed and heated until a pressure of 1900 p.s.i.g. (which was slightly above the critical pressure) was attained. Heating was continued and the ethanol-water vapor was released intermittently from the autoclave to maintain the pressure at 1900 p.s.i.g. until a temperature of 300° C. was obtained. This temperature was above the critical temperature of the liquid phase of the ethanol-aquagel. The vapor in the autoclave was released slowly until substantially all of the vapor was removed and the autoclave cooled. A light aerogel having a density of 3 pounds per cubic foot and the bulk of which consisted of 95% air, was obtained.

The silica aerogel was then mechanically ground in air at room temperature in a laboratory mill until the particles of the ground material had a particle size of between 4 and 8 mesh, that is, all of the particles passed through a No. 4 mesh U.S. standard screen, but were retained on a No. 8 mesh U.S. standard screen. The material was then ground in a steam grinding mill, specifically a Model 0405 "Jet-O-Mizer" mill manufactured by the Fluid Energy Mill and Processing Company of Philadelphia, Pa. The mill was equipped with an opening adjacent to internally placed steam or grinding nozzles. The silica aerogel was introduced into the mill and almost immediately contacted with superheated steam, at a temperature of 300 to 375° C., which was continually introduced through the nozzles. The particles were suspended and agitated in the superheated steam which rapidly built-up a pressure in the mill which varied between 140 p.s.i.g. and 200 p.s.i.g. The force of the steam simultaneously ground and transported the particles to a discharge opening in the mill where they were discharged into a receptacle.

The product obtained was a light (1 pound per cubic foot) white, finely divided Group I, organo-silica aerogel powder. Particle size determinations, conducted as previously described, showed that the particles had an average particle size of 2.0 microns. The particle size distribution determined by centrifugation techniques was such that 24% of the particles had a particle size of between 0.5 and 1.0 micron, 26% had a particle size of between 1 and 2 microns, 27% of the particles had a particle size of between 2 and 3 microns, 17.5% of the particles had a particle size of between 3 and 4 microns and 5.5% of the particles had a particle size greater than 4, but less than 6 microns.

Based on specific surface area and external surface area determinations conducted as previously described, the product had a specific surface area of 340 square meters per gram and an external surface area of 1.90 square meters per gram. Pore volume and pore diameter determinations showed the product had a total pore volume of 745 milliliters per gram and an average pore radius of 110 angstroms.

A chemical analysis for carbon and hydrogen showed that the product was an organo-silica aerogel which contained 1.14% by weight of carbon and 1.37% by weight of hydrogen, demonstrating an $SiO_2:C$ ratio of 15:1 and an $SiO_2:H$ ratio of 1.3:1.

When 1.6% by weight of this material was dispersed in a liquid commercial plastisol consisting of polyvinyl chloride and dioctyl phthalate the viscosity (Brookfield) increased from 4,000 centipoises to 133,000 centipoises at 25° C. On the other hand a 6.0% dispersion of a prior art silica aerogel, prepared as described in the next to the last paragraph of Example I, in such plastisol resulted in a viscosity (Brookfield) of only 130,000 centipoises at 25° C. The viscosity measurements were made using the apparatus described in the third paragraph of Example I.

EXAMPLE VI

The finely divided organo-silica aerogel of Example V was fed to a commercial air circulating heater, the circulating air in the heater and the heater itself being maintained at a temperature of 650° C. (The heating unit employed is manufactured commercially by the General American Transportation Company and is known as a Fluidizer Heater.) The finely divided organo-silica aerogel particles were suspended in the heated air in this heater for 35 seconds and discharged therefrom into a suitable receptacle. The material obtained was a Group II organo-silica aerogel which contained 0.5% of carbon and 1.1% by weight of hydrogen, demonstrating an $SiO_2$:C ratio of 36:1 and an $SiO_2$:H ratio of 1.4:1.

The finely divided product was a light (1 pound per cubic foot density) Group II organo-silica aerogel powder and was examined for specific surface area, external surface area, particle size, particle size distribution, pore volume and pore diameter according to the methods previously described. Based on this examination the finely divided product had an average particle size of 2.0 microns. The particle size distribution was such that 26% of the particles had a particle size of between 0.5 and 1 micron, 25% of the particles had a particle size of between 1 and 2 microns, 27% of the particles had a particle size in the range of between 2 and 3 microns, 16.5% of the particles had a particle size of between 3 and 4 microns and 5.5% of the particles had a particle size greater than 4 but less than 6 microns.

The product also had a specific surface area of 350 square meters per gram, an external surface area of 1.9 meters per gram, a total pore volume of 750 milliliters per gram and an average pore radius of 115 angstroms.

When 2% by weight of the finely divided organo-silica aerogel was dispersed in the liquid uncured commercial polyester resin described in Example II the viscosity (Brookfield) was increased from 850 centipoises to 3,750 centipoises at 25° C. On the other hand a 6% by weight dispersion of the prior art silica aerogel prepared as observed in the next to last paragraph of Example I in the same polyester resin resulted in an increase in viscosity (Brookfield) of only 2,560 centipoises at 25° C.

The $SiO_2$:C and $SiO_2$:H ratios were calculated by converting the weight percent of $SiO_2$ in the silica aerogel, the weight percent of carbon and hydrogen on the silica aerogel to mol percentages. The $SiO_2$:C ratios were calculated by dividing the mol percent of carbon into the mol percent of the $SiO_2$. The $SiO_2$:H ratios were calculated by dividing the mol percent of hydrogen into the mol percent of $SiO_2$.

What is claimed is:

1. The process of preparing an organo-silica aerogel which comprises (1) heating an acidic silica hydro-organosol having a pH of from about 1.8 to 4.5 and comprising (a) silica, (b) from about 8 to 20 mols, per mol of $SiO_2$ in said sol, of a substantially neutral, water-miscible organic liquid consisting of carbon, hydrogen and oxygen atoms and (c) water, thereby forming a gel, (2) heating the gel in a closed system without subjecting it to a substantial compressive liquid-solid interface until substantially all of the liquid phase of the gel has been converted to a vapor phase, (3) separating said vapor from said gel thereby forming an aerogel and (4) heating said aerogel at a temperature in the range of from about 90° C. to about 750° C., at a pressure of from about 10 p.s.i.g. to about 200 p.s.i.g., and for a time sufficient to form an organo-silica aerogel comprising a silica polymer having siloxy groups and containing carbon and hydrogen atoms chemically bound to a portion of the siloxy groups in said organo-silica aerogel, said organo-silica aerogel being further characterized in having an $SiO_2$ to carbon atom ratio of from about 10:1 to about 50:1 and an $SiO_2$ to hydrogen atom ratio of from about 0.77:1 to 2:1.

2. The process of preparing an organo-silica aerogel which comprises (1) heating an acidic silica hydro-organosol having a pH of from about 1.8 to 4.5 and comprising (a) silica, (b) from about 8 to 20 mols, per mol of $SiO_2$ in said sol, of a substantially neutral, water-miscible, organic liquid consisting of carbon, hydrogen and oxygen atoms and (c) water, thereby forming a gel, (2) heating the gel in a closed system without subjecting it to a substantial compressive liquid-solid interface until substantially all of the liquid phase of the gel has been converted to the vapor phase (3) separating said vapor from said gel thereby forming an aerogel and (4) heating said aerogel at a pressure of from about 10 p.s.i.g. to about 200 p.s.i.g. at a temperature in the range of from about 90° C. to 750° C. until an organo-silica aerogel is formed.

3. The process of preparing an organo-silica aerogel which comprises (1) heating an acidic silica hydro-organosol having a pH of from about 1.8 to about 4.5 and comprising (a) silica, (b) from about 8 to about 20 mols per mol of $SiO_2$ in said sol, of a substantially neutral water-miscible organic liquid consisting of carbon, hydrogen and oxygen atoms and (c) water, thereby forming a gel, (2) heating the gel in a closed system without subjecting it to a substantial compressive liquid-solid interface until substantially all of the liquid phase of the gel has been converted to the vapor phase, (3) separating said vapor from said gel thereby forming an aerogel and (4) heating said aerogel at a pressure of from about 10 p.s.i.g. to about 200 p.s.i.g. at a temperature in the range of from about 90° C. to 350° C. until an organo-silica aerogel is formed.

4. The process as in claim 3 wherein the organic liquid is ethanol.

5. The process as in claim 3 wherein the organic liquid is methanol.

6. The process as in claim 3 wherein the organic liquid is isopropanol.

7. The process of preparing an organo-silica aerogel which comprises (1) heating an acidic silica hydro-organosol having a pH of from about 1.8 to about 4.5 and comprising (a) silica, (b) from about 8 to 20 mols per mol of $SiO_2$ in said silica, of a substantially neutral water-miscible organic liquid consisting of carbon, hydrogen and oxygen atoms and (c) water, thereby forming a gel, (2) heating the gel in a closed system without subjecting it to a substantial compressive liquid-solid interface until substantially all of the liquid phase of the gel has been converted to the vapor phase, (3) separating said vapor from said gel thereby forming an aerogel and (4) heating said aerogel at a temperature in the range of about 350° C. to about 750° C. and at a pressure of from about 10 p.s.i.g. to about 200 p.s.i.g. until an organo-silica aerogel is formed.

8. The process of preparing an organo-silica aerogel which comprises (1) heating an acidic silica hydro-organosol having a pH of from about 1.8 to about 4.5 and comprising (a) silica, (b) from about 8 to 20 mols, per mol of $SiO_2$ in said silica, of a substantially neutral, water-miscible organic liquid consisting of carbon, hydrogen and oxygen atoms and (c) water, thereby forming a gel, (2) heating the gel in a closed system without subjecting it to a substantial compressive liquid-solid interface until substantially all of the liquid phase of the gel has been converted to the vapor phase, (3) separating said vapor from said gel thereby forming an aerogel, (4) heating said aerogel at a pressure of from about 10 p.s.i.g. to 200 p.s.i.g. at a temperature in the range of from about 90° C. to 375° C. until an organo-silica aerogel is formed and (5) heating said organo-silica aerogel at a temperature in the range of from about 350° C. to about 750° C. and at a pressure of from about 10 p.s.i.g. to about 200 p.s.i.g. for from about 15 seconds to 2 hours.

9. The process as in claim 8 wherein the water-miscible organic liquid is ethanol.

10. The process of preparing a finely divided organo-silica aerogel which comprises (1) heating an acidic silica hydro-organosol having a pH of from about 1.8 to about 4.5 and comprising (a) silica, (b) from about 8 to 20 mols, per mol of SiO₂ in said sol, of a substantially neutral, water-miscible, organic liquid having a boiling point below that of water at atmospheric pressure and consisting of carbon, hydrogen and oxygen atoms and (c) water, thereby forming a gel, (2) heating the gel in a closed system without subjecting it to a substantial compressive liquid-solid interface until substantially all of the liquid phase of the gel has been converted to the vapor phase, (3) separating said vapor from said gel thereby forming an aerogel and (4) simultaneously heating and comminuting said aerogel at a pressure of from about 10 p.s.i.g. to 200 p.s.i.g. at a temperature in the range of from about 90° C. to 375° C. until a finely divided organo-silica aerogel is formed.

11. The process as in claim 10 wherein the finely divided organo-silica aerogel produced is subsequently heated at a temperature in the range of from about 350° C. to about 750° C. for from about 15 seconds to 2 hours.

References Cited
UNITED STATES PATENTS

| | | | |
|---|---|---|---|
| 2,657,149 | 10/1953 | Iller | 252—313 X |
| 2,736,668 | 2/1956 | Broge | 117—100 X |
| 2,868,280 | 1/1959 | Sargent et al. | 252—317 X |
| 3,051,657 | 8/1962 | Power | 252—317 X |

LEON D. ROSDOL, *Primary Examiner.*

J. GREENWALD, *Examiner.*

R. D. LOVERING, *Assistant Examiner.*